United States Patent [19]

McCarville

[11] Patent Number: 5,639,535
[45] Date of Patent: Jun. 17, 1997

[54] COMPOSITE INTERLEAVING FOR COMPOSITE INTERFACES

[75] Inventor: Douglas A. McCarville, Auburn, Wash.

[73] Assignee: The Boeing Company, Seattle, Wash.

[21] Appl. No.: 661,034

[22] Filed: Jun. 6, 1996

[51] Int. Cl.$^6$ ................... B32B 3/10; B32B 7/00
[52] U.S. Cl. ................ 428/119; 428/120; 428/122; 244/123; 244/131; 156/182
[58] Field of Search ................... 428/120, 119, 428/122; 244/131, 119, 120, 123; 52/729.2, 731.1; 156/182

[56] References Cited

U.S. PATENT DOCUMENTS

| | | | |
|---|---|---|---|
| 1,473,842 | 11/1923 | Frederick | 428/120 |
| 4,113,910 | 9/1978 | Loyd | 244/131 |
| 4,177,306 | 12/1979 | Schulz et al. | 428/107 |
| 4,606,961 | 8/1986 | Munsen et al. | 428/120 |
| 5,096,525 | 3/1992 | Engwall . | |

Primary Examiner—Alexander Thomas
Attorney, Agent, or Firm—Christensen, O'Connor Johnson & Kindness PLLC

[57] ABSTRACT

A method for fabricating composite parts having improved pull-off strengths between portions of the composite part. In one embodiment, a sine wave spar is formed from two U-shaped channels having opposing flanges and a central web. The U-shaped channels are joined along the webs. The triangular gap created between the edges of the two U-shaped channels along the joining surface are filled by interleaving layers of unidirectional prepreg with the layers of prepreg that form the caps or flanges of the sine wave spar. In one embodiment of the invention, the layers of prepreg used as radius filler plies become progressively narrower as they are interleaved from within the gap outward towards the outer edge of the flanges. In another embodiment, the layers of prepreg used as radius filler plies become progressively narrower as they are interleaved between the cap plies.

20 Claims, 6 Drawing Sheets

COMPOSITE INTERLEAVING FOR COMPOSITE INTERFACES

FIELD OF THE INVENTION

The present invention relates to methods for fabricating composite parts, and more specifically to methods for enhancing the pull-off strength of integral web/cap composite interfaces.

BACKGROUND OF THE INVENTION

The use of high strength fiber-reinforced composite materials in the manufacture of aircraft and other lightweight structures has increased steadily since the introduction of such materials. Composite materials have a high strength-to-weight ratio and stiffness. These properties make composite materials attractive for use in the design of lightweight structures. Some of the drawbacks to using composite materials have been their relatively high fabrication costs, difficulties in manufacturing defect-free parts and poor damage tolerance. Generally, it has been difficult to produce parts formed of high strength composite materials that have the same damage tolerance and fabrication cost as comparable metal parts.

One area of structural and fabrication concern in composite parts is abrupt geometry changes such as the sharp radius of curvature between the webs and caps or flanges commonly found on composite spars, ribs, bulkheads, etc. Generally, in such applications a planar or sine wave shear web is joined to a highly loaded cap or flange at a sharp angle. Difficulties in part fabrication and part geometry often prevent the layers of composite material forming the shear web from extending over the entire width of the caps or flanges. In addition, the caps or flanges generally carry greater loads than the shear webs. Thus, the flanges often include additional reinforcing layers of composite material that are placed over the top of the layers of composite material that form the webs and a portion of the caps or flanges.

Due to the highly loaded nature of the caps or flanges, there is a concern that the loads applied to the caps and flanges will result in separation between the reinforcing cap plies of composite material and the underlying web plies of composite material that are joined to form the flanges. This is of particular concern in composite structures that carry large out of plane loads that tend to pull the caps or flanges away from the shear webs to which they are joined. Composite structures that undergo large out-of-plane loads include aircraft spars, ribs, and bulkheads. Currently, composite structures that undergo large out of plane loads generally use "chicken fasteners" that extend through the cap plies and web plies of composite material to ensure that the layers of composite material remain joined during use of the composite part. For example, composite wing spars and ribs often incorporate chicken fasteners to ensure that the flanges remain joined to the shear webs during loading.

It is desirable in many aircraft applications for the interface between the caps and underlying structure to support pull-off loads on the order of 4,000 to 7,000 lbs/in. Such magnitudes of pull-off loads are greater than are typically achievable using current co-cured composite material technology. Thus, as described above, such highly loaded composite structures incorporate chicken fasteners to increase the maximum pull-off loads.

The use of chicken fasteners in composite parts increases both the weight and fabrication complexity of the finished part. Such fasteners are also an area of concern throughout the maintenance lifetime of the composite part. The fasteners must be frequently inspected to ensure that they do not come loose during the cyclic loading that composite parts undergo.

As can be seen from the discussion above, there exists a need for improved methods of fabricating composite parts that improve pull-off strengths in highly loaded structures such as the flanges or caps of spars, ribs or bulkheads, etc. The present invention is directed towards fulfilling this need.

SUMMARY OF THE INVENTION

The present invention is a method and resulting structure that increases the pull-off strengths of various composite parts. In the present invention, the prior art use of a concentrated unidirectional composite radius filler is replaced with multiple narrow layers of composite prepreg material that are interleaved between the layers of prepreg material forming the composite part in order to form the radius filler.

In one method of the invention, a composite structure having an I-shaped cross section is formed. Two U-shaped channel structures are formed from layers of composite material so that each channel structure has a centrally located shear web and a flange extending outward from an edge of the shear web. The two U-shaped channel structures are joined along the shear webs to form a composite workpiece having an I-shaped cross-section. A triangular gap formed between an edge of the joined shear webs along the flanges is filled by interleaving radius filler plies of composite prepreg between reinforcing cap strips of composite prepreg. The resulting composite workpiece being cured to form the finished composite part.

In accordance with other aspects of the invention, the radius fillers become either progressively narrower or progressively wider depending upon the embodiment of the invention as additional layers of composite prepreg are applied into the gap formed between the joined channel structures. In one embodiment, the shear web has a sine wave contour.

In accordance with other aspects of the invention, the method may be used to form a spar, rib, or bulkhead. The cap strips may be interleaved between each radius filler ply of composite material or multiple cap strips can be interleaved between the radius filler plies. In still other embodiments, the cap strips may be interleaved between every other or every third, etc., radius filler ply.

The invention also encompasses composite structures formed in accordance with the method of the invention.

The invention's use of radius filler plies that are interleaved between the composite cap strips forming the flanges of the structure results in improved pull-off strengths for the formed composite part. The interleaving of the radius filler plies between the cap strips forming the composite flanges help to reduce the stress concentrations within the formed composite part near the triangular gap as compared to prior art composite parts formed with unidirectional composite radius fillers.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

3

Figure 2:
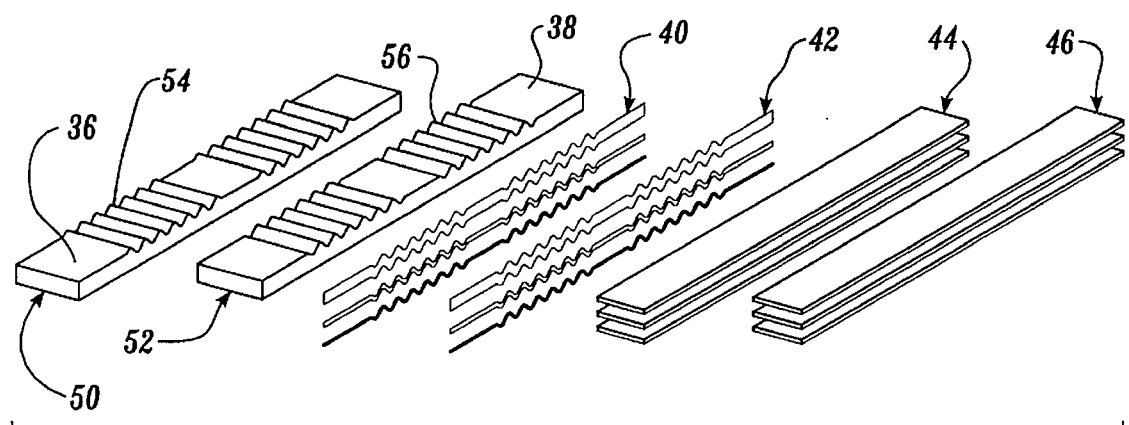
Figure 3:
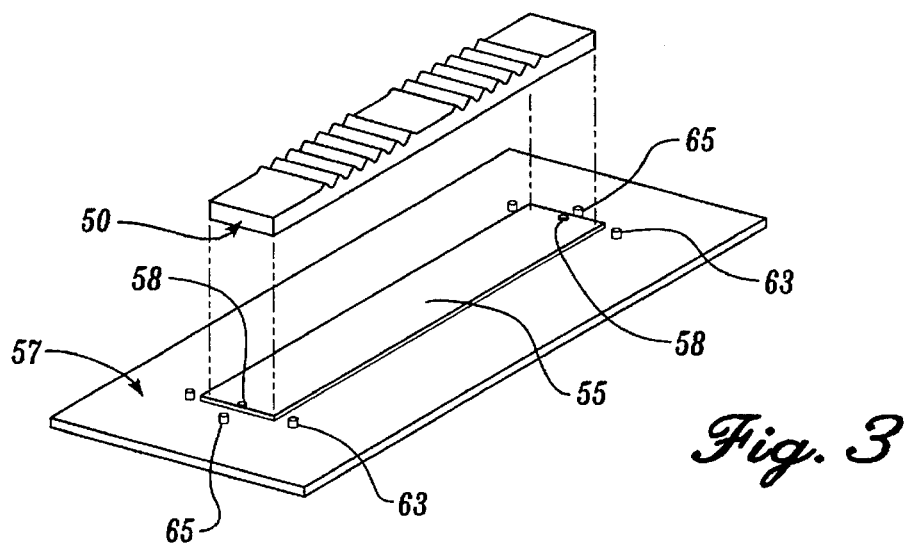
Figure 4:
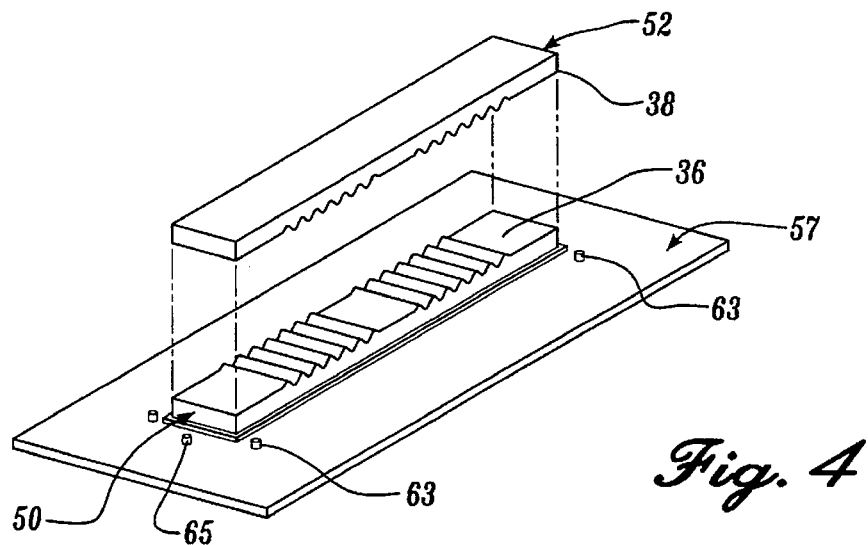
Figure 5:
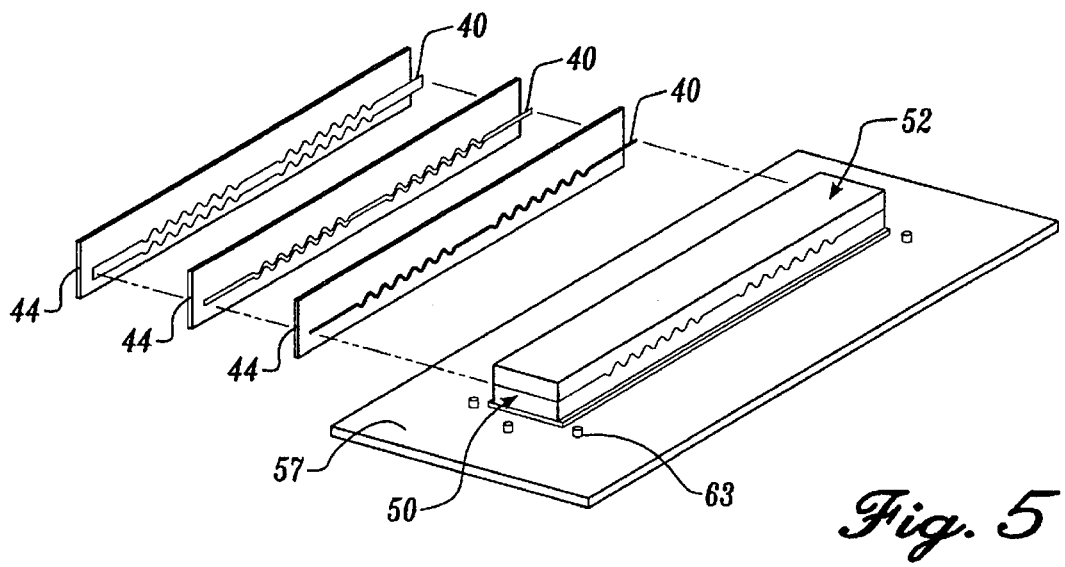
Figure 6:
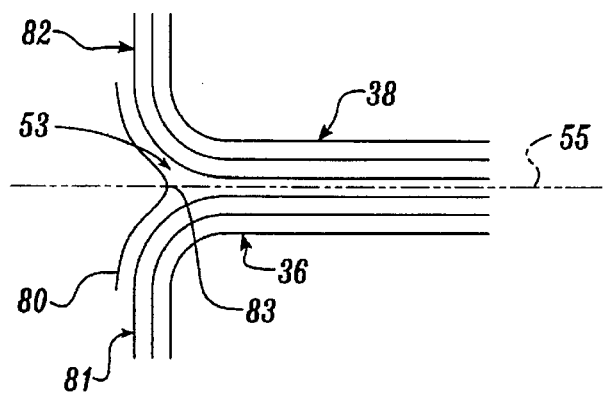
Figure 7:
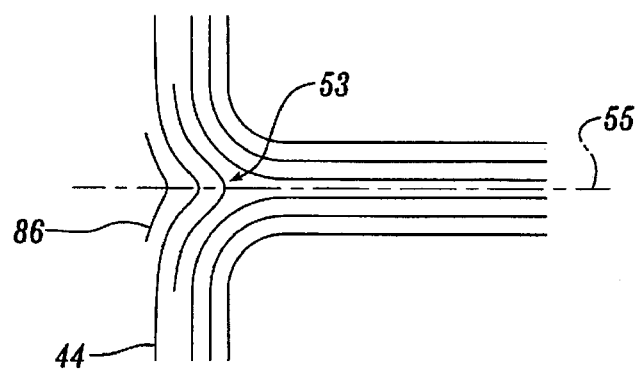
Figure 8:
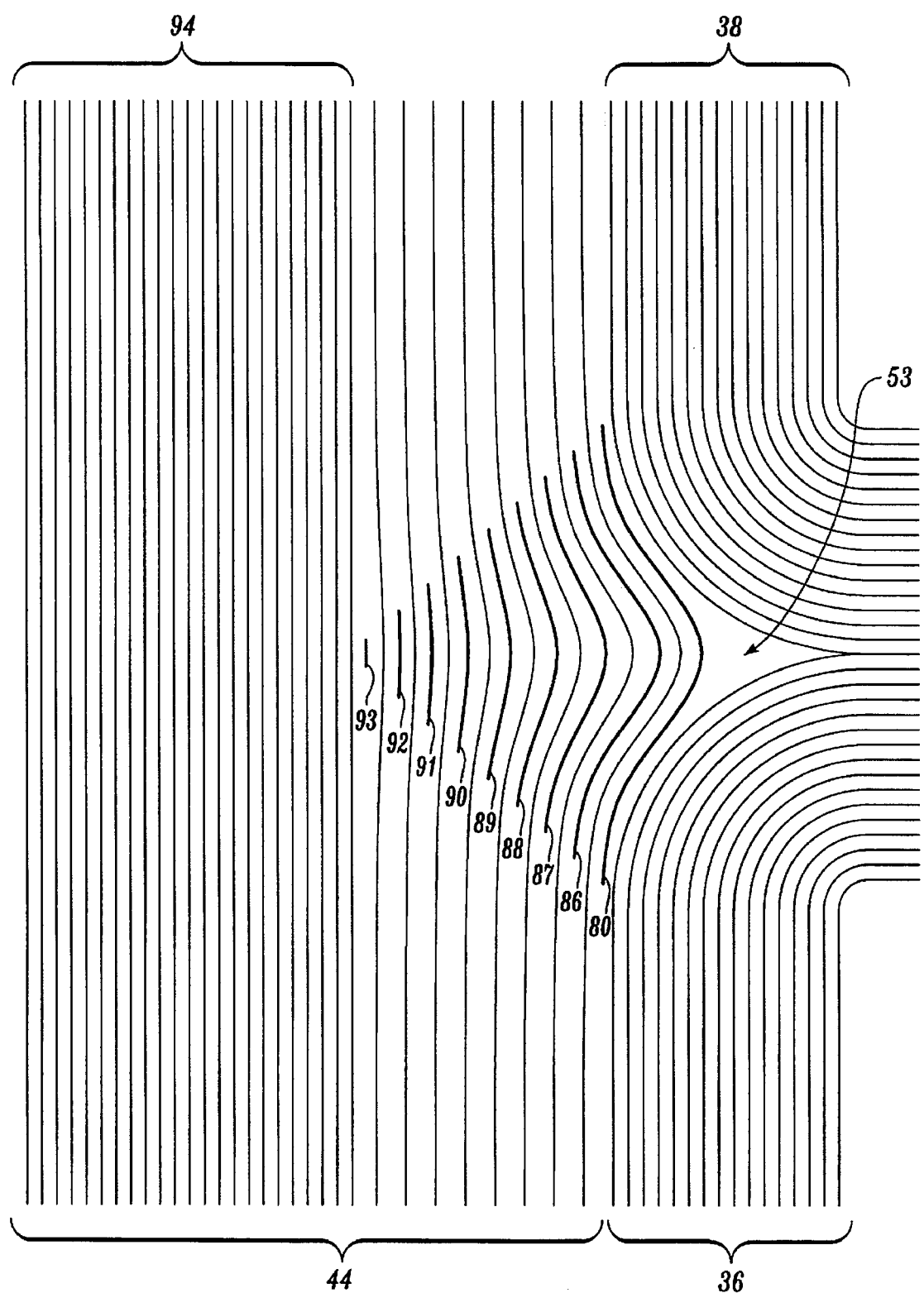
Figure 9:
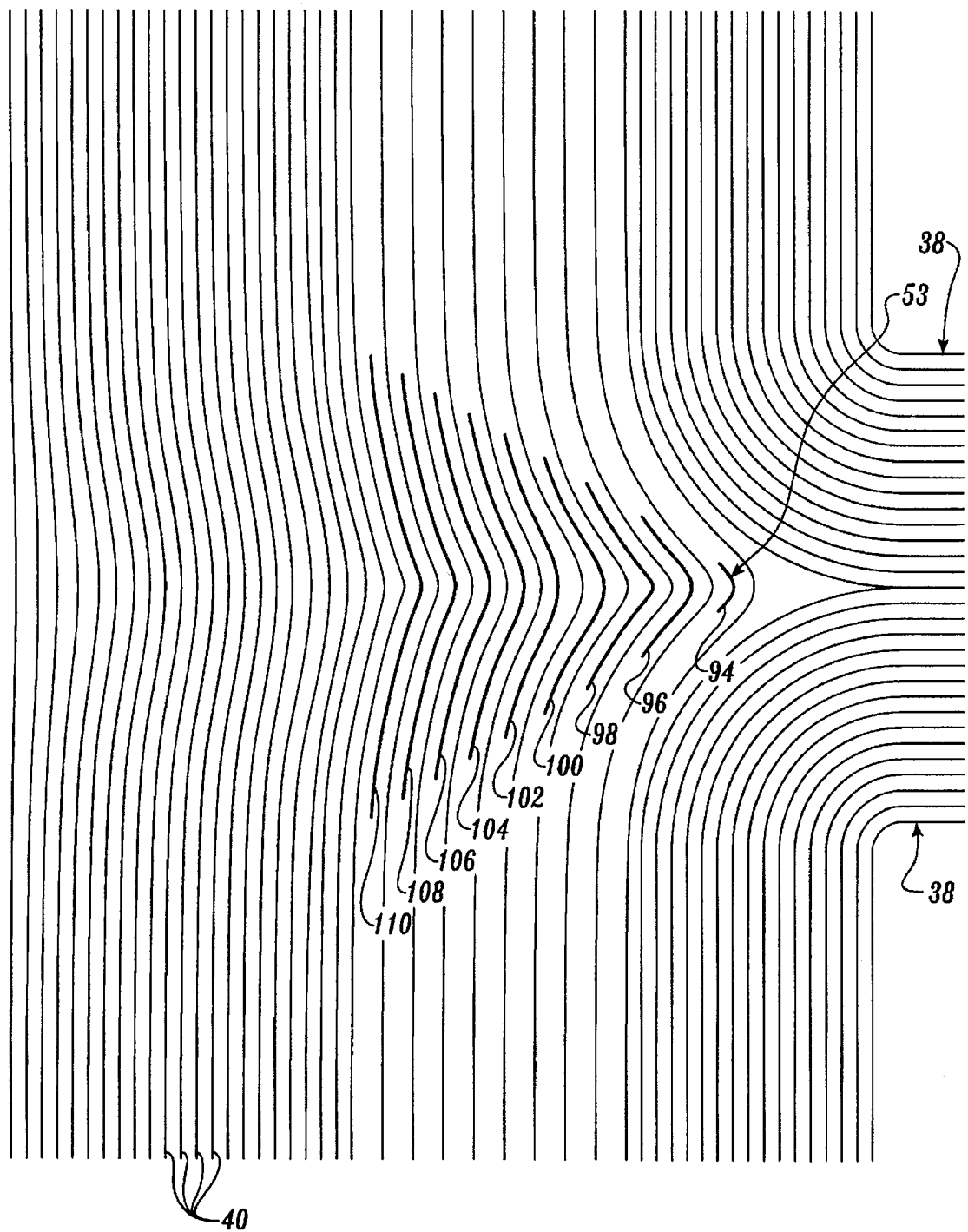
Figure 10:
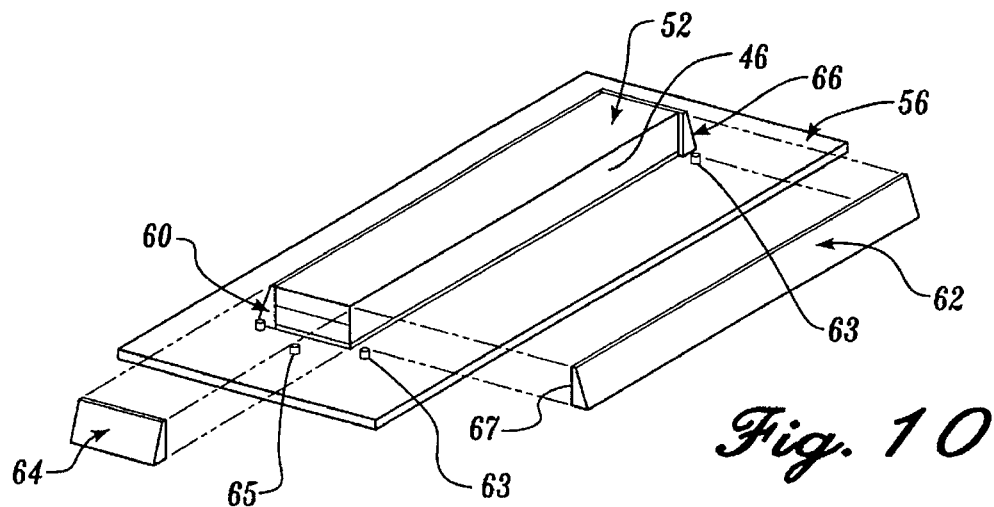
Figure 11:
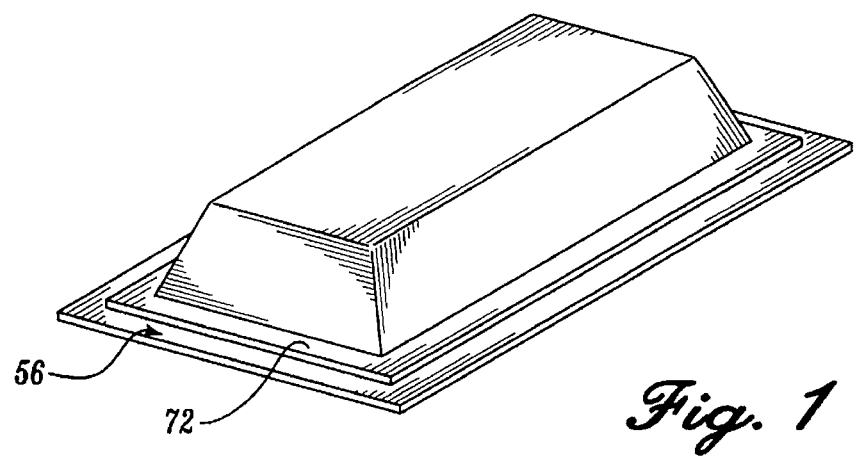

FIG. 2 is a perspective view of the upper and lower tool inserts and composite subassemblies used to form the sine wave spar;

FIG. 3 is a partially exploded view of the upper tool insert and baseplate;

FIG. 4 is a partially exploded view of the upper and lower tool inserts and baseplate;

FIG. 5 is a partially exploded view of the upper and lower tool inserts and radius filler plies and cap plies of composite material;

FIG. 6 is a schematic cross section of a portion of the composite workpiece used to form the sine wave spar;

FIG. 7 is another schematic cross section of a portion of the composite workpiece;

FIG. 8 is another schematic cross section of a portion of the preferred embodiment of the sine wave spar;

FIG. 9 is yet another schematic cross section of a portion of another embodiment of the sine wave spar;

FIG. 10 is a partially exploded view of the upper and lower tool inserts and left and right side tools;

FIG. 11 is a perspective view of the assembled tools and breather cloth; and

Figure 12:
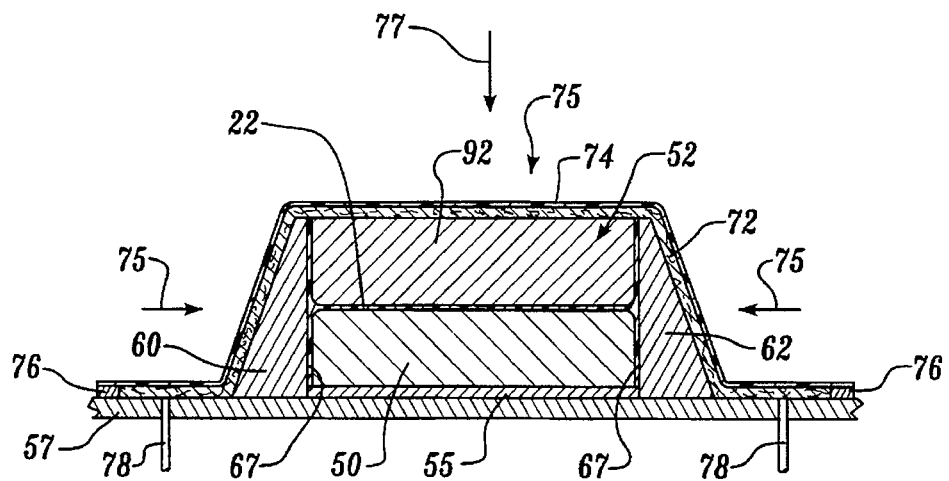

FIG. 12 is a cross section of the assembled composite workpiece and tools.

DETAILED DESCRIPTION OF THE PREFERRED EMBODIMENT

Figure 1:
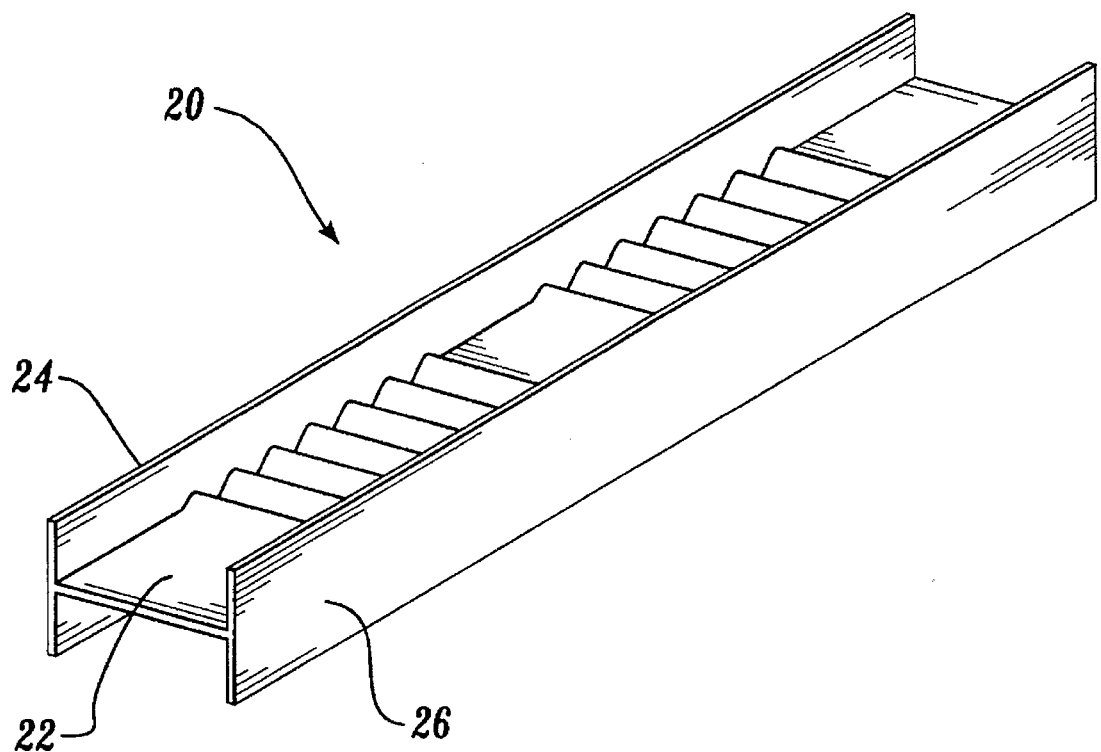
FIG. 1 is a perspective view of an exemplary sine wave spar fabricated in accordance with the invention.

The present invention is a method to fabricate composite parts with improved pull-off strengths between the shear webs and flanges or caps of the composite parts. The invention is described below with respect to a preferred embodiment used to form an I-beam or sine wave spar 20 (FIG. 1). However, the invention may be used to form a wide variety of composite structures. Similarly, the preferred embodiment is described below with respect to forming a composite sine wave spar out of a fiber reinforced, epoxy matrix prepreg composite material. However, the invention may be used with various composite materials, including composite prepregs having an epoxy, bismaleimide or thermoplastic matrix reinforced with either unidirectional or cloth fibers, such as fiberglass, graphite or Kevlar®.

FIG. 1 illustrates a sine wave spar 20 fabricated in accordance with the invention. As best illustrated in FIG. 1, the sine wave spar 20 is generally an I-beam having a sine wave central web 22 that extends between opposing left and right spar caps 24 and 26, respectively.

In the preferred embodiment, the sine wave spar 20 is fabricated using subassemblies preformed of layers of composite prepreg that are then joined together in an assembly process to form a composite workpiece. The composite workpiece is formed within a tooling concept that supports the prepreg composite material during subsequent curing. The formed composite workpiece and tooling concept are placed within a vacuum bag or diaphragm and are compacted and cured within an autoclave under high temperatures and pressures to produce the finished composite sine wave spar 20.

In the preferred embodiment, the sine wave spar 20 is assembled from a series of preformed subassemblies including lower and upper U-shaped channel structures or channels 36 and 38 (shown on lower and upper tool inserts 50 and 52 in FIG. 2), left and right radius filler plies 40 and 42, and left and right caps strips 44 and 46. For the purposes of this description the terms channel structures are used to mean any composite structures that may be placed together to form a composite structure having intersecting surfaces, for example, L-shaped, U-shaped, T-shaped structures, etc., and are not limited to the U-shaped channels 36 and 38 used to form the sine wave spar 20.

The lower and upper U-shaped channels 36 and 38 are formed by laying up individual layers of composite prepreg material over lower and upper tool inserts 50 and 52 (FIGS. 2 and 12). Each tool insert 50 and 52 is generally rectangular and includes a forming surface 54 and 56 (FIG. 2), respectively. Each forming surface 54 and 56 has a sine wave contour corresponding to the contour desired on the central web 22 of the formed composite sine wave spar 20.

Layers of composite prepreg material are laid up on the forming surfaces 54 and 56 so that the layers of prepreg follow the sine wave contours of the forming surfaces. The edges of the layers of prepreg wrap around the opposing edges of the tool inserts 50 and 52 to form the opposing flanges of the lower and upper U-shaped channels 36 and 38 (FIG. 4). The layers of composite prepreg material can be placed over the tool inserts 50 and 52 using hand lay-up procedures, automated tape laying equipment, or other appropriate fabrication methods.

The left and right radius filler plies 40 and 42 and left and right cap strips 44 and 46 are precut to shape prior to their being assembled to form a composite workpiece as described below. In the case of the left and right radius filler plies 40 and 42, they are cut into consecutively wider strips (FIG. 2) having a sine wave contour that closely parallels the sine wave contour of the forming surfaces 54 and 56. The filler plies 40 and 42 and cap strips 44 and 46 may be precut to shape using any appropriate method, generally an automated cutting system.

After the lower and upper U-shaped channels 36 and 38 are fabricated, the lower tool insert 50 is placed on a flat gauge sheet 55 (FIG. 3). The gauge sheet 55 is mounted on a rigid rectangular base plate 57. The base plate 57 has a larger surface area than the gauge sheet 55 and supports the tooling during processing, as described below.

The lower tool insert 50 is indexed in a predetermined location on the gauge sheet 55 and base plate 57 using a plurality of indexing pins 58 in a manner well known in the art. The indexing pins 58 extend upward from the surface of the base plate 57 and gauge sheet 55 and engage recesses (not shown) in the lower surface of the lower tool insert 50. After the lower tool insert 50 is indexed, the upper tool insert 52 and thus, upper U-shaped channel 38 is inverted and placed on top of the lower tool insert 50 and lower U-shaped channel 36 and aligned (FIGS. 4 and 5) in a manner well known in the art. For example, indexing pins (not shown) can extend upward from the upper surface of the lower tool insert 50 to engage recesses (not shown) in the lower surface of the upper tool insert 52.

As the lower and upper tool inserts 50 and 52 are aligned and placed together, the sine wave contoured surface of each of the lower and upper U-shaped channels 36 and 38 are placed in contact with each other, forming the central web 22 of the sine wave spar 20 (FIGS. 1 and 9). Due to the rounded edges of the lower and upper tool inserts 50 and 52 and thus U-shaped channels 36 and 38, a triangular gap 53 (FIG. 6) is formed along both edges of the intersection between the joined flanges and sine wave contoured surfaces of lower and upper U-shaped channels 36 and 38.

In accordance with the invention, the triangular gap 53 is filled using both the radius filler plies 40 and 42 and the cap strips 44 and 46 as illustrated in FIGS. 6–8. FIGS. 6–8 schematically show the assembly of the left radius filler plies 40 and cap strips 44. The right radius filler plies 42 and cap strips 46 are assembled in a similar manner. As illustrated in FIG. 6, after the lower and upper U-shaped channels 36 and 38 are joined, the first radius filler ply 80 is aligned with and pushed into the gap 53 as illustrated in FIG. 6. The first radius filler ply 80 is positioned in the gap 53 so that it is centered around the centerline of the joined U-shaped channels 36 and 38. The first radius filler ply 80 may be pushed into the gap 53 by hand or through the use of an automated placement system. As illustrated in FIG. 6, once pushed into the gap, the first radius filler ply 80 follows the outer edges 81 and 82 of the flanges of the lower and upper U-shaped channels 36 and 38. The central portion 83 of the first radius filler ply 80 forms a V that extends into and partially fills the triangular gap 53.

In the preferred embodiment, the first radius filler ply 80 is sufficiently wide to extend across the gap 53 and partially over the length of the formed flanges on the upper and lower U-shaped channels 36 and 38. After the first radius filler ply 80 is in place, a cap strip 44 (FIG. 7) is placed over the top of the first radius filler ply 80. The center of the cap strip 44 is also pressed into the gap 53 so that it lies adjacent the outer surface of the first radius filler ply 80, thus also filling a portion of the gap 53. Unlike the first radius filler ply 80, the cap strip 44 extends over the width of the flanges formed on the lower and upper U-shaped channels 36 and 38.

After the first cap strip 44 is in place, a second radius filler ply 86 (FIG. 7) is placed over the first cap strip 44 centered around the centerline 55 of the gap 53 as illustrated in FIG. 7. In the preferred embodiment, the second radius filler ply 86 is narrower than the first radius filler ply 80 and thus does not extend over as great a distance of the width flanges of the lower and upper U-shaped channels 36 and 38 as the first radius filler ply 80. After the second radius filler ply 86 is placed, another cap strip 44 is placed over the top of the second radius filler ply 86 as illustrated in FIG. 8. The interleaving process is continued with successive radius filler plies 87–93 being interleaved between successive cap strips 44 as illustrated in FIG. 8. Each successive radius filler ply 87–93 is narrower than the preceding filler ply so that the radius filler plies gradually fill in the triangular gap 53 formed between the lower and upper U-shaped channels 36 and 38. The result of applying the progressively narrowing radius filler plies 80–93 is that the triangular gap 53 is filled and the outermost cap strips 44 (FIG. 8) form a smooth surface that establishes the outer surfaces of the left flange of the sine wave spar 20.

As illustrated in FIG. 8, in the preferred embodiment discussed above, the first radius filler ply 80 is wider than the subsequent radius filler plies 86–93. Thus, the radius filler plies go from the widest radius filler ply adjacent to the U-channels 36 and 38 to the narrowest radius filler ply furthest from the U-shaped channels. In alternate embodiments of the invention such as that shown in FIG. 9, progressively wider radius filler plies 96–104 could be interleaved between the cap strips 44 in order to fill the triangular gap 53. As shown in the alternate embodiment of FIG. 9, the use of consecutively wider radius filler plies 96–104 also fills the triangular gap 53 and results in a smooth surface at the outermost cap strips 106.

In the preferred and alternate embodiments discussed above and illustrated in FIGS. 8 and 9, the first layer of composite material placed in the gap 53 is the first radius filler ply 80 or 96 depending upon the embodiment. In alternate embodiments of the invention, one or more of the cap strips 44 could be applied prior to placing a radius filler ply in the lay-up. In addition, although the embodiments of FIGS. 8 and 9 have only a single cap strip 44 placed between each radius filler ply, in alternate embodiments more than one cap ply could be placed between each radius filler ply.

After all the left and right cap strips 44 and 46 and left and right radius fillers 40 and 42 are in place, left and right side rail tools 60 and 62 (FIG. 10) are placed adjacent to the outermost left and right cap strips 44 and 46. The left and right side rail tools 60 and 62 have rigid forming surfaces 67 (FIGS. 10 and 12) corresponding to the shape of the outer surfaces of the flanges of the formed sine wave spar 20. The left and right side rail tools 60 and 62 rest upon the base plate 57. The forming surfaces 67 of the side rail tools 60 and 62 define the dimensions of the exterior surfaces of the formed spar caps 24 and 26 (FIG. 1).

Depending upon the application, the left and right side rail tools 60 and 62 may be allowed to float, i.e., move in and out toward and away from the upper and lower tool inserts 50 and 52, during processing. Alternately, the left and right side rail tools 60 and 62 may be indexed into a predetermined position by indexing pins 63 (FIGS. 3 and 10) extending upward from the base plate 57. The indexing pins 63 are received within recesses (not shown) in the lower surface of the side rail tools 60 and 62.

After the side rail tools 60 and 62 are in place, end tools 64 and 66 may be placed on the opposite ends of the lower and upper tool inserts 50 and 52 (FIG. 10). The end tools 64 and 66 are indexed in place by indexing pins 65 that extend upward from the base plate 57. The indexing pins 65 engage recesses (not shown) in the lower surface of the end tools 64 and 66. Depending on the application, end tools may not be needed.

The lower and upper tool inserts 50 and 52, side rail tools 60 and 62, and end tools 64 and 66 surround the composite material forming the composite workpiece that is to form the sine wave spar 20. As illustrated in FIG. 11, after the tooling is in place, the entire assembly, including tooling and composite workpiece, is covered by a cloth or fiberglass breather material 72 (FIGS. 11 and 12). The breather material 72 partially covers the surface of the base plate 57 and extends over the top of the left and right side rail tools 60 and 62, end tools 64 and 66, and upper tool insert 52. A vacuum bag 74 (FIG. 12) is then placed over the top of the cloth breather material 72 and sealed to the base plate 57 along its edges using sealing material 76 in a manner well known in the art.

As known in the art, it is advantageous to remove air and volatiles, produced during the processing of the composite material, from the interior of the vacuum bag 74. In the preferred embodiment, air and volatiles within the vacuum bag 74 are removed by withdrawing them through exhaust ports 78 (FIG. 12) that extend upward through the base plate 57 and open into the interior of the vacuum bag 74. After the composite workpiece 27 is vacuum bagged, the combined tooling assembly and composite workpiece is placed within an autoclave (not shown) and the exhaust ports 78 are attached to the vacuum exhaust (not shown) of the autoclave. The autoclave is then closed and the interior of the autoclave is pressurized and heated in accordance with the processing requirements of the composite material used.

During processing, a vacuum is placed on the exhaust ports 78 to evacuate the interior of the vacuum bag 74. The vacuum may be placed on the exhaust ports 78 through the use of any appropriate vacuum device, such as the vacuum pump system of the autoclave. The combined pressure produced by the evacuation of the vacuum bag 74 and the pressurization of the autoclave produces a hydrostatic force that presses the upper tool insert 52 downward and the side rail tools 60 and 62 inward as illustrated by arrows 75. As the tools are pressed downward and inward, the forming surfaces of the tools contact the composite workpiece and compress the workpiece in order to consolidate it. In addition to pressurizing the autoclave, the interior of the autoclave, and thus tooling and composite workpiece are heated to an appropriate processing temperature. The pressure and temperature within the autoclave are maintained in accordance with the processing parameters of the composite material until it is fully consolidated and cured.

The consolidation and cure cycles for various composite materials are readily known by those of ordinary skill in the art. The consolidation and cure cycles differ depending upon the material used and are available from the manufacturers of the composite materials used. In the preferred embodiment, the composite material used was a composite prepreg material having a thermal set epoxy matrix and graphite reinforcing fibers. However, the invention is not limited to particular material systems and may be used with other composite materials, such as polyimides, thermoplastics, etc.

Although the fabrication of the preferred embodiment is described with respect to the use of an autoclave, other methods can also be used to process the composite materials. For example, in some fabrication methods the tooling assembly is heated through the use of heating elements embedded within the tools, inductive heating, or through the use of other heating methods. Similarly, although in the preferred embodiment an autoclave is used to apply a consolidation pressure to the composite workpiece, a mechanical apparatus, such as a press, could also be used.

In the invention, the pull-off strength between the cap strips 44 and 46, radius filler plies 40 and 42 and the layers of composite material forming the lower and upper U-shaped channels 36 and 38 is increased through the use of interleaving the radius filler plies with the cap strips. In prior art composite parts, the radius filler is formed of a concentration of unidirectional fibers that are pulltruded or otherwise formed into the shape of the triangular gap 53 formed between the two joined U-shaped channels 36 and 38. The large concentration of unidirectional fibers results in the radius filler having a greater stiffness than the surrounding composite structure. This causes a stress concentration to develop in the region of the radius filler during loading of the composite part. This stress concentration is believed to be one of the factors that results in poor pull-off strengths between the cap strips 44 and 46 and the layers of composite material that form the caps or flanges of the composite part.

In the invention, interleaving the radius filler plies 40 and 42 between the cap strips 44 and 46 helps reduce the stress concentration in the region of the gap 53. In accordance with the invention, the radius filler plies 40 and 42 may be formed of either unidirectional tape having all the fibers oriented along the length of the composite part, unidirectional tape having the fibers oriented at various angles, or layers of woven composite material. Also in accordance with the invention, each radius filler ply 40 and 42 can be oriented at a different angle thus possibly creating a more homogenous reinforcement through the use of the radius filler plies as opposed to prior art radius fillers that are formed entirely of unidirectional fibers running the length of the gap 53.

In the preferred embodiment of the invention, it was found advantageous to form the radius filler plies 40 and 42 from unidirectional composite prepreg having fibers running along the length of the sine wave spar. In the present invention, due to the narrow width of the various radius filler plies 40 and 42, the use of radius filler plies having fibers oriented at other angles increased fabrication difficulties. It is advantageous that the combined composite lay-up produced through the use of the various radius filler plies form a symmetric laminate in order to avoid the possible introduction of stress concentrations or warpage. Thus, the use of radius filler plies having fibers all running the same direction, i.e., along the length of the gap or sine wave spar, simplifies fabrication.

Embodiments of the invention having all the radius filler plies 40 and 42 formed of unidirectional composite material having fibers running the length of the flanges, improved pull-off strengths over similarly fabricated parts using prior art concentrated unidirectional radius fillers. The invention achieved greater pull-off strengths by interleaving the various radius filler plies 40 and 42 between the cap strips 44 and 46 distributing the unidirectional fibers of the radius filler plies over a greater percentage of the lay-up as compared to prior art fabrication methods using unidirectional radius fillers.

In order to analyze the effects of the present invention, test coupons were fabricated from both a K3B thermoplastic composite prepreg and a toughened epoxy thermoset composite prepreg material sold under the designation 8552. Both the K3B thermoplastic and the 8552 toughened epoxy composite prepreg materials utilized graphite reinforcement fibers. The test coupons were fabricated in the form of composite I-beam sections having a web thickness of approximately 0.267 inches, a web width or height of approximately 8.65 inches, and a total flange thickness of approximately 0.644 inches. In order to produce this geometry test coupon, each U-shaped channel 36 and 38 was fabricated using 16 layers of composite material oriented so that the lay-up of each channel was symmetric about the centerline. When the channels were joined, the central web 22 had a thickness of 32 plies of composite material. In order to form the caps or flanges of the test coupons, 68 cap strips formed of tape composite prepreg were used in a lay-up that was symmetrical around the centerline to form each cap 24 and 26. The test coupons fabricated used 9 radius filler plies to fill in each gap 53. The radius filler plies ranged in width from 0.2 inches for the narrowest radius filler ply to 1 inch for the widest radius filler ply. The radius filler plies were interleaved between the cap strips as described above in order to fill the gap 53.

Test specimens were fabricated using both radius filler plies 96–104 ((FIG. 9) that became progressively wider and radius filler plies 80–93 (FIG. 8) that became progressively narrower. The resulting test coupons were tested in a pull-off test and both embodiments of the invention produced 10% or 20% higher pull-off values than the baseline composite coupons using a pulltruded unidirectional radius filler. The test results showed little difference between the test coupons fabricated using radius filler plies that became progressively wider (FIG. 9) and radius filler plies that became progressively narrower (FIG. 8).

Although the preferred embodiment of the invention has been described with respect to a sine wave spar, the invention could also be used to form composite I-beam spars or ribs, skin/spar interfaces, bulkhead/flange interfaces, etc. The present invention could also be used in additional embodiments to form other types of interfaces in composite parts. For example, interleaving separate layers or plies of composite prepreg could be used to produce greater pull-off values in other composite geometries such as in T-shaped intersections, cross-shaped intersections, etc.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of forming a composite part comprising:
   (a) forming two channel structures from layers of composite material, each channel structure having a shear web and a flange extending outward from an edge of the shear web;
   (b) joining the two channel structures along the shear webs;
   (c) filling a triangular gap formed between an edge of the shear webs of the joined channel structures along the joined flanges with radius filler plies of composite prepreg that are interleaved between cap strips of composite prepreg to form a composite workpiece, the radius filler plies of composite prepreg placed between the cap strips of composite prepreg becoming progressively narrower as additional layers of composite prepreg are applied into the gap; and
   (d) curing the resulting composite workpiece to form the composite part.

2. The method of claim 1, wherein the channel structures have a U-shaped cross-section and the method further comprises joining the two channel structures along the shear webs to produce a composite workpiece having an I-shaped cross-section.

3. The method of claim 1, further comprising forming the channel structures with shear webs having a sine wave contour.

4. The method of claim 1, further comprising joining the channel structures to form a bulkhead having a peripheral flange that extends out of the plane of the bulkhead.

5. The method of claim 1, further comprising filling the triangular gap by interleaving at least one cap strip between each radius filler ply.

6. A method of forming a composite part comprising:
   (a) forming two channel structures from layers of composite material, each channel structure having a peripheral flange and a shear web;
   (b) joining the two channel structures along the shear webs;
   (c) filling a triangular gap formed between an edge of the shear webs of the joined channel structures with radius filler plies of composite prepreg that are interleaved between cap strips of composite prepreg to form a composite workpiece, the radius filler plies of composite prepreg placed between the cap strips of composite prepreg becoming progressively wider as additional layers of composite prepreg are applied into the gap; and
   (d) curing the resulting composite workpiece to form the composite part.

7. The method of claim 6, wherein the channel structures have a U-shaped cross-section and the method further comprises joining the two channel structures along the shear webs to produce a composite workpiece having an I-shaped cross-section.

8. The method of claim 6, further comprising forming the channel structures with shear webs having a sine wave contour.

9. The method of claim 6, further comprising joining the channel structures to form a bulkhead having a peripheral flange that extends out of the plane of the bulkhead.

10. The method of claim 6, further comprising filling the triangular gap by filling the gap with radius filler plies that have a cap ply interleaved between each radius filler ply.

11. A composite structure, comprising:
    (a) two channel structures, each channel structure having a shear web and a flange extending outward from one side of the shear web along at least one edge of the shear web, the two channel structures being joined together along the shear web to form the composite structure, each channel structure being formed of individual layers of composite material that are joined together; and
    (b) a plurality of radius filler plies of composite material and cap strips of composite material, the radius filler plies of composite material and cap strips of composite material being interleaved together and placed adjacent the flanges of the joined channel structures so that the radius filler plies fill a gap formed between the edges of the joined channel structures along an intersection of the flanges of the channel structures.

12. The composite structure of claim 11, wherein the radius filler plies are progressively narrower toward an outer surface of the flanges.

13. The composite structure of claim 11, wherein the radius filler plies are progressively wider toward an outer surface of the flanges.

14. The composite structure of claim 11, wherein a cap strip is interleaved between each radius filler ply of composite material.

15. The composite structure of claim 11, wherein the shear web has a sine wave contour.

16. The composite structure of claim 11, wherein the composite structure has an I-shaped cross section.

17. A composite beam structure, comprising:
    (a) a plurality of layers of composite material joined together to form two U-shaped channel structures, each channel structure having a central shear web and opposing flanges, the channel structures being joined together, along the shear webs so that the flanges of the two channel structures are aligned and extend outward from opposing sides of the joined shear webs, and wherein a triangular gap is formed along an intersection between the joined channel structures along the flanges; and
    (b) a plurality of cap strips and radius filler plies of composite material interleaved together and placed within the triangular gap in order to fill the triangular gap and form a smooth outer surface on the aligned joined flanges.

18. The composite structure of claim 17, wherein the radius filler plies become progressively narrower toward the outer surface of the flanges.

19. The composite structure of claim 17, wherein the radius filler plies become progressively wider toward the outer surface of the flanges.

20. The composite structure of claim 17, wherein the shear web has a sine wave contour.

* * * * *